(12) United States Patent
Suzuki

(10) Patent No.: US 7,087,916 B2
(45) Date of Patent: Aug. 8, 2006

(54) RADIATION IMAGE STORAGE PANEL

(75) Inventor: Hideki Suzuki, Kanagawa (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 246 days.

(21) Appl. No.: 10/652,316

(22) Filed: Sep. 2, 2003

(65) Prior Publication Data

US 2004/0104363 A1    Jun. 3, 2004

(30) Foreign Application Priority Data

Aug. 30, 2002 (JP) ............................ 2002-254854
Sep. 10, 2002 (JP) ............................ 2002-264576
Aug. 19, 2003 (JP) ............................ 2003-295521

(51) Int. Cl.
*G03B 42/08*    (2006.01)

(52) U.S. Cl. .................................. 250/584; 250/484.4
(58) Field of Classification Search ............. 250/484.4, 250/584
See application file for complete search history.

(56) References Cited

U.S. PATENT DOCUMENTS

| 5,877,504 | A  | * | 3/1999  | Yanagita et al. ......... 250/484.4 |
| 6,031,236 | A  | * | 2/2000  | Arakawa et al. ......... 250/484.4 |
| 6,075,250 | A  | * | 6/2000  | Fukui et al. ............. 250/484.4 |
| 6,246,063 | B1 | * | 6/2001  | Fukui ...................... 250/484.4 |
| 6,376,844 | B1 | * | 4/2002  | Tasaki et al. ............ 250/484.4 |
| 6,452,192 | B1 |   | 9/2002  | Kohda |
| 6,815,092 | B1 | * | 11/2004 | Van den Bergh et al. ... 428/690 |
| 6,927,404 | B1 | * | 8/2005  | Van den Bergh et al. ...................... 250/484.4 |
| 2003/0183777 | A1 | * | 10/2003 | Struye et al. ............ 250/484.4 |
| 2005/0040351 | A1 | * | 2/2005  | Suzuki ...................... 250/580 |
| 2005/0194547 | A1 | * | 9/2005  | Matsumoto et al. ..... 250/484.4 |

\* cited by examiner

*Primary Examiner*—Albert Gagliardi
(74) *Attorney, Agent, or Firm*—Sughrue Mion, PLLC

(57) ABSTRACT

A radiation image storage panel having a stimulable phosphor layer and a light-reflecting layer provided thereon, wherein the phosphor layer scatters both of a stimulating light and a stimulated emission emitted by the phosphor layer with a scattering length of 5 to 20 µm and said light-reflecting layer scatters a stimulating light with a scattering length of 5 µm or less is favorably employable for giving a reproduced radiation image having good quality.

9 Claims, 3 Drawing Sheets

...

RADIATION IMAGE STORAGE PANEL

FIELD OF THE INVENTION

The present invention relates to a radiation image storage panel employable in a known radiation image recording and reproducing method.

BACKGROUND OF THE INVENTION

The radiation image recording and reproducing method utilizes a radiation image storage panel containing a stimulable phosphor which absorbs a portion of a radiation energy (e.g., X-ray energy) when the radiation energy is applied to the stimulable phosphor and afterward produces a stimulated emission when a stimulating light or heat is applied to the radiation energy-absorbed phosphor.

Thus, the stimulable phosphor emits stimulated emission when excited with a stimulating light after having been exposed to a radiation as X-rays. Accordingly, the radiation having passed through an object or radiated by an object is absorbed by the phosphor layer of the storage panel in proportion to the applied radiation dose, and a radiation image of the object is produced in the storage panel in the from of a radiation energy-stored latent image. The radiation energy-stored image can be released as stimulated emission by sequentially irradiating the storage panel with a stimulating light. The stimulated emission is then photoelectrically detected to give electric signals, so as to reproduce a visible image from the electric signals.

Accordingly, the radiation image recording and reproducing method comprises the steps of causing the stimulable phosphor of the storage panel to absorb a radiation energy having passed through an object or having radiated from an object; sequentially exciting the stimulable phosphor with an electromagnetic wave such as visible light or infrared rays (stimulating light) to release the radiation energy stored in the phosphor as light emission (i.e., stimulated emission); photoelectrically detecting the emitted light to obtain electric signals; and reproducing the radiation image of the object as a visible image from the electric signals. The storage panel thus treated is subjected to a step for erasing a radiation image remaining therein, and then stored for the next recording and reproducing procedure. Thus, the radiation image storage panel can be repeatedly employed.

The radiation image storage panel employed in the above-describe method has a basic structure comprising a support and a stimulable phosphor layer provided on one surface of the support. If the phosphor layer is self-supporting, the support may be omitted. The phosphor layer usually comprises a binder and stimulable phosphor particles dispersed therein, but it may consist of agglomerated phosphor with no binder. The phosphor layer containing no binder can be formed by deposition process or firing process. Further, the layer comprising agglomerated phosphor soaked with a polymer is also known.

In general, a transparent film of polymer material is placed on a free surface (surface not facing the support) of the phosphor layer to keep the layer from chemical deterioration or physical damage. This surface protective film can be formed by various method, for example, by applying a solution of resin, by fixing a transparent resin film with adhesive, or by depositing inorganic materials on the phosphor layer.

The radiation image recording and reproducing method is very useful for obtaining a radiation image as a reproduced visible image, and it is desired for the radiation image storage panel employed in the method to have a high sensitivity and to give an image of high quality (such as high sharpness and high graininess).

Japanese Patent Provisional Publication 2001-124,898 discloses a radiation image storage panel having a stimulable phosphor layer and a light-reflecting layer provided thereon, wherein said light-reflecting layer scatters a stimulating light with a scattering length of 5 µm or less.

SUMMARY OF THE INVENTION

It is an object of the present invention to provide a radiation image storage panel capable of giving an image of high sharpness with high sensitivity.

It is another object of the invention to provide a process for reading a radiation image information of high quality out of the radiation image storage panel.

The present inventor has discovered that the quality of a radiation image reproduced from a radiation image storage panel can be enhanced by modifying the stimulable phosphor layer to scatter both of the stimulating light and the stimulated emission emitted by the stimulable phosphor layer with a short scattering length of a specific range in addition to providing a light-reflecting layer scattering a stimulating light with a shorter scattering length. The short scattering length of a specific range given to the stimulable phosphor layer functions to reduce scattering of the stimulating light and stimulated emission, while the shorter scattering length of the light-reflecting layer functions to effectively reflect the stimulating light. The inventor has further discovered that if the protective film (or layer) is formed to have a high haze so that a high scattering function is given to the protective layer, the sharpness of a reproduced radiation image is enhanced. It is known that the sharpness of a reproduced radiation image is impaired by the provision of a transparent protective layer.

Further, the inventor has discovered that the light-reflecting layer showing a short scattering length is favorably placed on a support via a cured adhesive layer.

Furthermore, the inventor has discovered that the latent radiation image stored in the above-mentioned new radiation image storage panel can be reproduced with high quality, if an exiting energy of a stimulating light is so adjusted that the stimulable phosphor layer emits a stimulated emission in an amount less than a saturation level.

The present invention has made based on the above-mentioned discoveries.

Accordingly, the present invention resides in a radiation image storage panel having a stimulable phosphor layer and a light-reflecting layer provided thereon, wherein said stimulable phosphor layer scatters both of a stimulating light and a stimulated emission emitted by said phosphor layer with a scattering length of 5 to 20 µm and said light-reflecting layer scatters a stimulating light with a scattering length of 5 µm or less.

The invention further resides in a process for reading a radiation image information out of the above-identified radiation image storage panel, which comprises the steps of:

placing means for emitting stimulating light and photoelectrically detecting stimulated emission in the vicinity of the radiation image storage panel on a surface side opposite to the light-reflecting layer;

applying a stimulating light to the stimulable phosphor layer of the radiation image storage panel with such stimulating energy that the stimulable phosphor layer emits a stimulated emission in an amount corresponding to 10 to 90% (preferably 30 to 90%) of a saturation level, while moving said means relatively to a position of the radiation image storage panel along a surface of the radiation image storage panel and scanning the stimulating light in a direction differing from a direction of the movement of the means;

detecting the stimulated emission in sequence by the means; and converting the detected stimulated emission into electric signals corresponding to a radiation image information.

As described above, the radiation image storage panel of the invention can give a reproduced radiation image of an improved quality (such as enhanced sharpness and improved graininess) by producing both of the stimulable phosphor layer and light-reflecting layer to have a short scattering length. It is known that a conventional radiation image storage panel gives increase of sensitivity but decrease of sharpness if the thickness of the stimulable phosphor layer is increased. The increase of sensitivity with decrease of sharpness means lowering of DQE indicating quality of image. In contrast, the radiation image storage panel of the invention gives increase of sensitivity with little decrease of sharpness when the thickness of the stimulable phosphor layer is increased. This means enhancement of DQE. Further, if thhe radiation image storage panel of the invention is provided with a protective layer having a high haze, the storage panel can produce a reproduced radiation image with a further improved quality.

The radiation image storage panel of the invention is particularly favorably employable in a radiation image recording and reproducing method which employs latent image reading means for emitting stimulating light and photoelectrically detecting stimulated emission under such condition that the stimulable phosphor layer emits a stimulated emission in an amount less than the saturation level. This radiation image recording and reproducing method is advantageously performed in the case that the latent image reading means containing a line sensor is employed in the linear detection mode.

DETAILED DESCRIPTION OF THE INVENTION

Scattering Length

The scattering length used in the present invention indicates a mean distance in which light travels straight until it is scattered, and hence a small value of scattering length means that the light is highly scattered. In accordance with Kubeluka-Munk theory, the scattering length can be calculated from the data obtained in the following measurement.

First, three film samples for a stimulable phosphor film and a light-reflecting film are prepared. Each film sample has a different thickness, but prepared from the same components. The thickness (μm) and the transmittance (%) of each sample are measured. The transmittance (%) can be measured by means of a commercial available spectrophotometer. The transmittance is measured at a wavelength corresponding to the stimulating light or the stimulated emission from the phosphor contained in the phosphor film.

From the thickness (μm) and the transmittance (%) obtained in the above measurement, the scattering length is calculated in accordance with the following formula (A) derived from Kubeluka-Munk theory.

In the beginning, light strength distribution I(Z) at a depth of Z is calculated using a thickness (d μm) of the sample film, a light-scattering length ($1/\alpha$) of the sample film, and a light-absorption length ($1/\beta$) of the sample film. I(Z) is then divided into i(Z) for a component advancing from the upper surface of the sample film and j(Z) for a component advancing from the lower surface to the upper surface of the sale film. Therefore, the relationship is written as follows:

$$I(Z)=i(Z)+j(Z)$$

Increase or decrease of strength by scattering/absorption at an optional depth Z in a film having a small thickness dz can be obtained by solving the following simultaneous differential equations according to Kubeluka-Munk theory:

$$di/dz=-(\beta+\alpha)i+\alpha j \quad (1)$$

$$di/dz=(\beta+\alpha)j-\alpha i \quad (2)$$

Assuming the conditions of $\gamma^2=\beta(\beta+2\alpha)$, $\xi=(\alpha+\beta-\gamma)/\alpha$, $\eta=(\alpha+\beta+\gamma)/\alpha$, and K and L for integration constants, the general solutions for i and j of the simultaneous equations are described below:

$$i(z)=Ke^{-\gamma z}+Le^{\gamma z}$$

$$j(z)=K\xi e^{-\gamma z}+L\eta e^{\gamma z}$$

The light transmittance T of a sample film having a thickness d is described as follows:

$$T=i(d)/i(0)$$

Assuming that there is no returning light (namely, j(d)=0), a light transmittance T of the sample film alone is calculated in terms of a function of the thickness d, as follows:

$$T(d)=(\eta-\xi)/(\eta e^{\gamma z}-\xi e^{-\gamma z}) \quad (3)$$

The light transmittance data measured by means of a spectrophotometer and data of the sample film are processed according to the equation (3) and fitted by a method of least squares, to give an optimum $1/\alpha$ and $1/\beta$. Thus, the light-scattering length is determined.

Figure 3:
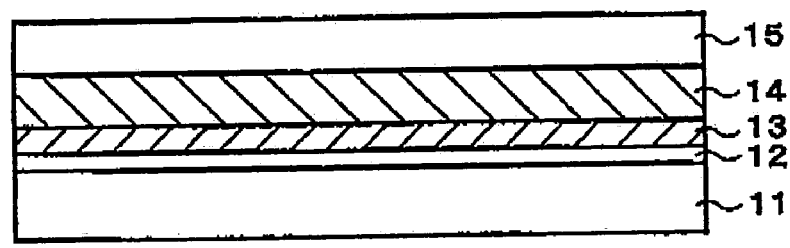
FIG. 3 illustrates a preferred structure of a radiation image storage panel of the invention.

A representative structure of the radiation image storage panel of the invention is illustrated in FIG. 3. In FIG. 3, the radiation image storage panel consists of a support 11, an adhesive layer 12, a light-reflecting layer 13, a stimulable phosphor layer 14, and a protective layer 15.

Preferred Embodiments

Preferred embodiments of the invention are described below.

(1) The stimulable phosphor layer comprises stimulable phosphor particles and a binder in a weight ratio of 1:10 to 1:50.

(2) The stimulable phosphor particles have a mean particle size in the range of 2 to 10 μm.

(3) The stimulable phosphor particles are contained in the phosphor layer at a packing density of 60 vol. % or more.

(4) The stimulable phosphor has a protective layer on the side opposite to the light-reflecting layer, said protective layer has a haze in the range of 5 to 80%.

(5) The protective layer comprises a polymer material and a filler dispersed in the polymer material, said filler having a mean particle size of 0.1 to 10 μm and being contained in the protective layer in an amount of 5 to 50 wt. % based on an amount of the polymer material.

(6) A support sheet is attached to the light-reflecting layer via a cured adhesive layer.

(7) The cured adhesive layer is cured in the presence of a curing agent.

(8) The curing agent is an isocyanate compound.

(9) The cured adhesive layer has a thickness of 1 to 50 μm.

Radiation Image Storage Panel

The radiation image storage panel of the invention is now described in detail.

[Support]

The support generally is a flexible resin sheet or a flexible resin film and has a thickness of 50 μm to 1 mm. The support can be made of polyethylene terephthalate, polyethylene naphthalate, aramide, or polyimide and can be transparent, light-reflecting, or light-absorbing. If desired, the support can be a metal sheet, a ceramic sheet, or a glass sheet.

[Adhesive Layer]

On the support is placed a light-reflecting layer. The light-reflecting layer is preferably placed on the support via an adhesive layer. The adhesive layer is preferably cured.

The adhesive layer is preferably produced from a curable resin such as polyester resin, acrylic resin, polyurethane resin, poly(vinyl butyral) resin, poly(vinyl acetate) resin, or vinylidene chloride/vinyl chloride copolymer. These resins can be employed singly or in combination.

The curable resin is preferably employed in combination with a curing agent such as an isocyanate compound or a melamine resin. Preferred is an isocyanate compound. The curing agent is preferably employed in an amount of 1 to 50 wt. %, more preferably 5 to 30 wt. % (based an the amount of the curable resin).

The adhesive layer can be coated on the support by the below-described process.

A coating solution comprising a curable resin (and, if desired, a curing agent) in an organic solvent is prepared. The coating solution is uniformly spread on a support, dried and heated for curing. The solvent can be that which will be described hereinafter for the preparation of a stimulable phosphor layer. The coating solution may contain an electroconductive material. The spreading of the coating solution can be carried out by an ordinary method such as a method using a doctor blade, roll coater, or knife coater. The adhesive layer generally has a thickness of 1 to 50 μm, preferably 3 to 30 μm.

The adhesive layer can be dissolved on its surface portion (generally 1 to 50 vol. % of the adhesive layer) in an organic solution of a coating solution for the preparation of a light-reflecting layer when the last coating solution is coated on the adhesive layer. The dissolved portion of the adhesive layer is dried with the coating solution for light-reflecting layer. Therefore, the bonding between the adhesive layer and light-reflecting layer containing a large amount of light-reflecting particles becomes satisfactorily high. Particularly, if the adhesive layer is cured, the cured adhesive layer is appropriately resistant to the dissolution in the organic solvent of the coating solution for light-reflecting layer to obviate excessive mixing the adhesive layer with the light-reflecting layer.

[Light-Reflecting Layer]

On the adhesive layer (or directly on the support) is placed a light-reflecting layer.

The light-reflecting layer preferably comprises a binder and a light-reflecting material in the form of particles. The light-reflecting layer of the radiation image storage panel of the invention is prepared to scatter a stimulating light with a scattering length of 5 μm or less, preferably 4 μm or less.

Examples of the light-reflecting materials include $Al_2O_3$, $ZrO_2$, MgO, $BaSO_4$, $SiO_2$, ZnS, ZnO, $CaCO_3$, $Sb_2O_3$, $Nb_2O_5$, $2PbCO_3 \cdot Pb(OH)_2$, $PbF_2$, $BiF_3$, $Y_2O_3$, YOCl, $M^{II}FX$ ($M^{II}$ is Ba, Sr, or Ca, and X is Cl or Br), lithopone ($BaSO_4$+ZnS), magnesium silicate, basic lead silicate sulfate, basic lead phosphate, aluminum silicate, hollow polymer powder. The light-reflecting materials can be employed singly or in combination. The light-reflecting material preferably has a high refractive index so that the desired short light-scattering length is easily imparted to the light-reflecting layer. Accordingly, preferred are $Al_2O_3$, $ZrO_2$, $PbF_2$, $BiF_3$, $Y_2O_3$, or YOCl.

The light-reflecting layer showing the short light scattering length can be advantageously prepared using light-reflecting particles having a diameter similar to the wavelength of the stimulating light or using light-reflecting particles having a non-globular shape. For instance, the mean diameter of the light-reflecting particles preferably is ¼ or 2 times the wavelength of the stimulating light. The wavelength of the generally employed stimulating light is in the range of 500 to 800 nm. Therefore, the mean diameter of the light-reflecting particles preferably is in the range of 1.125 to 1.6 μm. It is also preferred that the light-reflecting particles have a BET specific surface area (per unit weight) of 1.5 $m^2/g$ or more, preferably in the range 2 to 10 $m^2/g$, more preferably in the range of 2.5 to 8 $m^2/g$.

The light-reflecting particles preferably has a bulk density of 1 $g/cm^3$ or less, more preferably 0.6 $g/cm^3$ or less.

The light-reflecting layer preferably contains a great number of voids so as to obviate close contact between adjoining particles, whereby imparting to the layer a high light refractive index and a short light scattering length.

The light-reflecting layer can be prepared by coating a coating dispersion comprising a binder and light-reflecting particles in an organic solvent uniformly on the adhesive layer (or directly on the support) and drying the coated dispersion. It is preferred that the binder and light-reflecting particles are contained in the coating dispersion in a weight ratio of 1:1 to 1:50, more preferably in a weight ratio of 1:2 to 1:20. Examples of the binders and organic solvents are described hereinafter for the preparation of the stimulable phosphor layer.

The coating of the coating solution can be carried out by an ordinary method such as a method using a doctor blade, roll coater, or knife coater. The light-reflecting layer generally has a thickness of 5 to 500 μm, preferably 20 to 200 μm.

[Stimulable Phosphor Layer]

On the light-reflecting layer is placed a stimulable phosphor layer. The stimulable phosphor layer of the radiation image storage panel of the invention has a property to scatter both of the stimulating light and the stimulated emission emitted by the phosphor layer with a scattering length of 5 to 20 μm.

As the stimulable phosphor, a stimulable phosphor giving a stimulated emission of a wavelength in the region of 300 to 500 nm when it is irradiated with a stimulating light of a wavelength in the region of 400 to 900 nm is preferably employed. Examples of the preferred stimulable phosphors include divalent europium or cerium activated alkaline earth metal halide phosphors (e.g., BaFBr:Eu, BaF(BrI):Eu), and cerium activated oxyhalide phosphors.

Most preferred stimulable phosphors are rare earth metal activated alkaline earth metal fluorohalide phosphors having the following essential constitutional formula (I):

$$M^{II}FX:zLn \qquad (I)$$

In the formula (I), $M^{II}$ is an alkaline earth metal such as Ba, Sr, or Ca; Ln is a rare earth metal such as Ce, Pr, Sm, Eu, Tb, Dy, Ho, Na, Er, Tm, or Yb; X is a halogen atom such as Cl, Br, or I; and z is a value satisfying the condition of $0<z\leqq0.2$.

$M^{II}$ of the formula (I) preferably comprises Ba in an amount of 50 atomic % or more. Ln preferably is Eu or Ce. It should be noted that the formula (I) does not mean F:X=1:1, but means to have a crystalline structure of BaFX. Thus, the formula (I) does not accurately indicate stoichiometric amounts of the constitutional elements. It is generally preferred that F is slightly rich in comparison with X, because $F^+$ center ($X^-$ center) produced in such composition efficiently gives a stimulated emission when the phosphor is stimulated with a light in the region of 600 to 700 nm.

Also preferred is a stimulable phosphor having the following essential constitutional formula (II):

$$LnOX:aCe \qquad (II)$$

In the formula (II), in is a rare earth element such as Y, La, Gd, or Lu, X is a halogen atom such as Cl, Br, or I, a is a number satisfying the condition of $0<a\leqq0.2$.

Also preferred is a stimulable cerium activated lutetium silicate phosphor having the following essential constitutional formula (III):

$$Lu_wY_xGd_yLa_zSIO_p:aCe \qquad (III)$$

In the formula (III), w, x, y, and z are numbers satisfying the conditions of $1.5\leqq w+x+y+z\leqq 2.2$, $x\geqq 0$, $y\geqq 0$, $z\geqq 0$, and $w/(w+x+y+z)>0.8$, p is a number required for adjusting the electric charge of the phosphor to 0, and a is a number satisfying the condition of $1\times 10^{-5}<a<1\times 10^{-1}$.

The stimulable phosphor of each formula can further contain one or more of the following additive components:

$$bA, wN^I, xN^{II}, yN^{III}$$

In the above formulas, A is a metal oxide such as $Al_2O_3$, $SiO_2$ or $ZrO_2$, in which source of the metal oxide preferably is extremely fine particles having a mean diameter (of primary particles) of 0.1 μm or less and has little reactivity to $M^{II}FX$ particles to keep the phosphor particles of the above-mentioned essential constitutional formula from coagulation; $N^I$ is a compound of an alkali metal such as Li, Na, K, Rb, or Cs; $N^{II}$ is a compound of an alkaline earth metal such as Mg and/or Be; and $N^{III}$ is a compound of a monovalent or trivalent metal such as Al, Ga, In, Tl, Sc, Y, La, Gd, or Lu. The metal compounds preferably are halide compounds.

In the formulas, each of b, w, x, and y is a value which means an amount of each source material, based on one molar amount of a compound of the above-mentioned constitutional formula, under the conditions of $0\leqq b\leqq 0.5$, $0\leqq w\leqq 2$, $0\leqq x\leqq 0.3$, and $0\leqq b\leqq 3$. Accordingly, the value of b, w, x, or y does not necessarily mean the ant of each element or compound existing in the finally produced phosphor. Further, each additive compound may exist as such in the finally produced phosphor or may react with a compound of the above-mentioned constitutional formula in the course of the preparation of the stimulable phosphor.

Furthermore, the stimulable phosphor of the formula (I) may contain one or more of the following compounds: compounds of Zn and Cd; metal oxides such as $TiO_2$, BeO, MgO, CaO, SrO, BaO, ZnO, $Y_2O_3$, $In_2O_3$, $GeO_2$, $SnO_2$, $Nb_2O_5$, $Ta_2O_5$, and $ThO_2$; compounds of Zr a Sc; compounds of B; compounds of As and Si; tetrafluoroborate compounds; hexafluoro compounds such as monovalent or divalent salts of hexafluorosilicic acid, hexafluorotitanic acid, or hexafluorozirconic acid; and compounds of transitional metals such as V, Cr, Mn, Fe, Co, and Ni, provided that the incorporated additives do not disturb the preparation of the essential phosphor composition of the formula (I), (II) or (III).

The above-mentioned stimulable phosphor particles generally have an aspect ratio of 1.0 to 5.0. The stimulable phosphor particles favorably employed for the production of the radiation image storage panel of the invention have an aspect ratio of 1.0 to 2.0, more preferably 1.0 to 1.5. The particle size preferably is in the range of 2 μm to 10 μm, more preferably 2 μm to 7 μm, in terms of Median diameter (Dm), and σ/Dm (σ is a standard deviation of the particle size distribution) preferably is 50% or less, more preferably 40% or less. The particles may be in the form of globular, parallelepiped, regular hexahedron, regular octahedron, tetradecahedron, intermediate polyhedron, or amorphous. The phosphor particles of tetradecahedron or globular are preferred.

Examples of the binders include natural polymers such as proteins (e.g., gelatin), polysaccharides (e.g., dextran) and gum arabic; and synthetic polymers such as polyvinyl butyral, polyvinyl acetate, nitrocellulose, ethyl cellulose, vinylidene chloride-vinyl chloride copolymer, polyalkyl (meth)acrylate, vinyl chloride-vinyl acetate copolymer, polyurethane, cellulose acetate butyrate, polyvinyl alcohol, linear polyester, and thermoplastic elastomers. The polymer material may be crosslinked.

For the preparation of the stimulable phosphor layer, the stimulable phosphor particles and binder are placed in an o c solvent to prepare a dispersion. The ratio of binder and stimulable phosphor particles in the phosphor dispersion generally is in the range of 1:10 to 1:50 (binder:phosphor, by weight).

Examples of the organic solvents include lower alcohols such as methanol, ethanol, n-propanol, and n-butanol, chlorine atom-containing hydrocarbon compounds such as methylene chloride and ethylene chloride, ketones such as acetone, methyl ethyl ketone, and methyl isobutyl ketone, esters of lower aliphatic acids with lower alcohols such as methyl acetate and ethyl acetate, ethers such as dioxane, ethylene glycol monoethyl ether, ethylene glycol monomethyl ether, and tetrahydrofuran, and mixtures of these solvents.

The coating dispersion (or phosphor dispersion) can contain one or more of additives such as dispersing agents, plasticizers, anti-yellowing agents, curing agents, and cross-linking agents.

The stimulable phosphor layer can be formed, for example, in the following known manner.

The phosphor dispersion is coated uniformly on the light-reflecting layer using the aforementioned known coating means, and the coated dispersion is dried to give a stimulable phosphor layer. The thickness of the phosphor layer is determined according to the characteristics of the phosphor, the desired property of the radiation image storage panel, and the mixing ratio of binder and phosphor, but generally is in the range of 20 μm to 1 mm, preferably 50 μm to 500 μm.

In the preparation of the stimulable phosphor layer, the phosphor particles are placed on the light-reflecting layer preferably in an amount of 50 to 200 mg/cm$^2$, more preferably 100 to 200 m/cm$^2$.

The coated stimulable phosphor layer is preferably compressed, for instance, by calendar processing, so that the packing density of the stimulable phosphor particles in the phosphor layer is increased such as to become 60 vol. % or more.

The stimulable phosphor layer can be a single layer or a multiple layer. In the multiple stimulable phosphor layer, the light-scattering property of each stimulable phosphor layer can be made different from each other.

The stimulable phosphor layer can be formed by other steps, namely, coating the phosphor dispersion on a temporary support (e.g., glass plate, metal plate, plastic sheet), drying the coated dispersion layer to form a phosphor layer, peeling off the phosphor layer, and then placing the phosphor layer on a desired support using an adhesive.

[Protective Layer]

On the phosphor layer, a surface protective film is preferably formed. In the invention, the protective film preferably has a haze of 5 to 80%, more preferably a haze of 30 to 60%, so that the quality of a reproduced radiation image is further enhanced.

The protective layer can be prepared by coating a solution of an organic polymer material such as cellulose derivative, poly(methyl methacrylate) or an fluororesin soluble in an organic solvent in an organic solvent on the stimulable phosphor. Otherwise, a separately prepared organic polymer film such as poly(ethylene terephthalate) film can be placed on the stimulable phosphor layer via an adhesive layer. Alternatively, an organic compound is vapor deposited on the stimulable phosphor layer to give the desired protective layer. The protective layer can be made of glass sheet.

The protective layer preferably contains a filler so that the desired haze can be easily given to the layer. Examples of the filler materials include inorganic materials such as alumina, silica, titanium dioxide, zirconium oxide, and yttrium oxide and organic materials such as highly cross-linked acrylic resin, highly cross-linked polystyrene, melamine-formaldehyde resin, and silicone resin. The filler preferably has a mean particle size in the range of 0.1 to 10 μm, more preferably 0.3 to 3 μm.

The filler is preferably employed in an amount of 5 to 50 wt. % based on the amount of the organic polymer material.

The protective layer may contain other additives, for example, a lubricant such as a perfluoroolefin resin powder and a cross-linking agent such as a polyisocyanate compound. The protective layer generally has a thickness of approx. 0.1 to 20 μm in the case of an organic polymer material layer, while the protective layer generally has a thickness of 100 to 1,000 μm in the case of a glass sheet or a sheet of inorganic material.

For enhancing resistance to staining, a fluororesin layer is preferably provided on the protective layer. The fluororesin layer can be formed by coating the surface of the protective layer with a solution of a fluororesin in an organic solvent, and drying the coated solution. The fluororesin way be used singly, but generally a mixture of the fluororesin and a film-forming resin is employed. In the mixture, an oligomer having polysiloxane structure or perfluoroalkyl group can be further added. Into the fluororesin layer, fine particle filler may be incorporated so as to reduce blotches caused by interference and to improve the quality of the resultant radiation image. The thickness of the fluororesin layer generally is in the range of 0.5 to 20 μm. In the formation of the fluororesin layer, additives such as a crosslinking agent, a film-hardening agent and an anti-yellowing agent can be used. In particular, the crosslinking agent advantageously improves durability of the fluoro-resin layer.

Thus, a radiation image storage panel of the invention can be prepared. The storage panel of the invention may be in known various structures. For example, in order to improve the sharpness of the resulting radiation image, at least one of the layers or films may be colored with a colorant which does not absorb the stimulated emission but the stimulating rays. Otherwise, the radiation image storage panel of the invention can further have a layer of radiation energy-absorbing phosphor layer in addition to the aforementioned stimulable phosphor layer. The radiation energy-absorbing phosphor means a phosphor that absorbs an energy of radiation such as X-rays and produces spontaneous emission in a visible to ultraviolet region. Examples of the radiation energy-absorbing phosphors include $LnTaO_4$: (Nb,Gd), $Ln_2SiO_5$:Ce, LnOX:Tm (Ln=rare earth element), CsX (X=halogen atom), $Gd_2O_2S$:Tb, $Gd_2O_2S$:Pr,Ce, $ZnWO_4$, $LuAlO_3$:Ce, $Gd_3Ga_5O_{12}$:Cr, Ce, $HfO_2$, and their analogues.

The process of the invention for reading radiation image information stored in the above-described radiation image storage panel is explained below by referring to the attached drawings.

Figure 1:
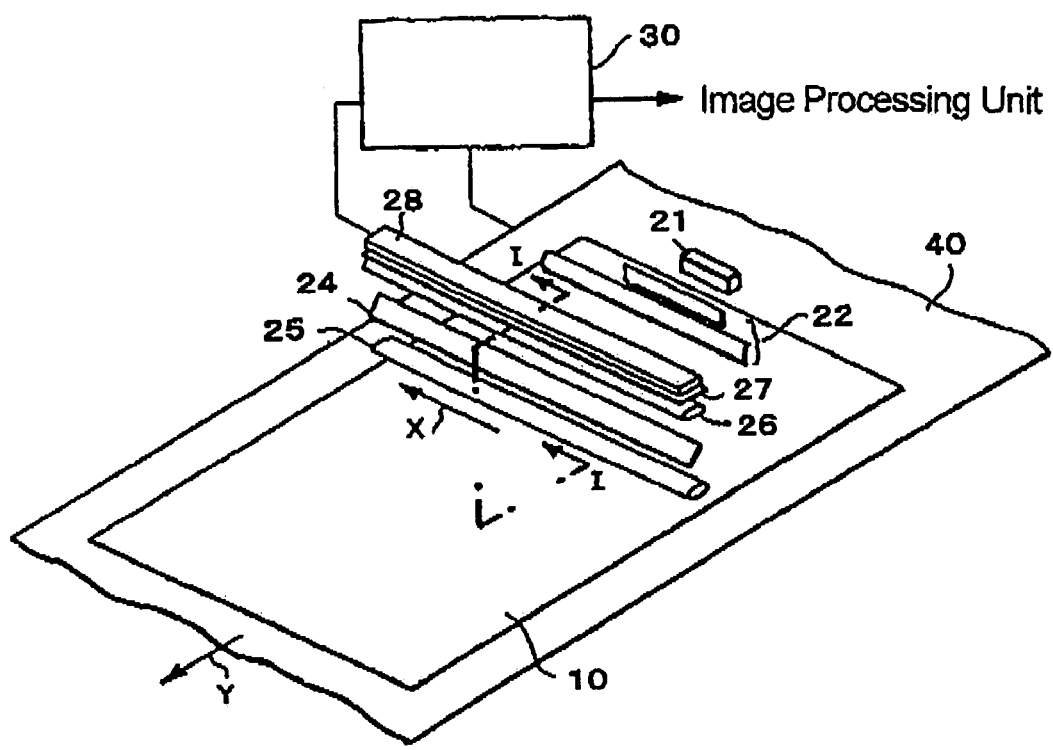
FIG. 1 illustrates a sketch showing a radiation image information-reading apparatus for performing a process of the invention.
Figure 2:
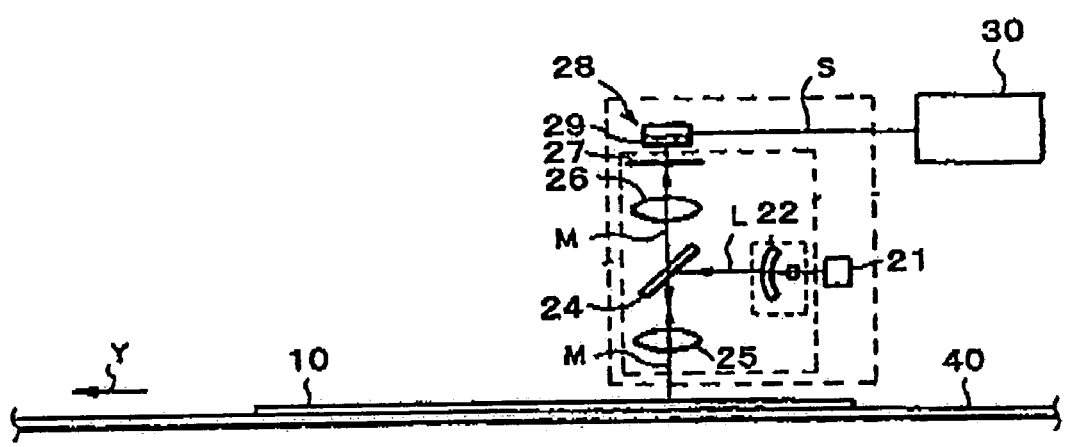
FIG. 2 is a sectional view of the apparatus of FIG. 1 taken along the I—I line.

FIG. 1 is a sketch showing a radiation image information-reading apparatus for performing the process of the invention. FIG. 2 is a sectional view of the apparatus of FIG. 1 taken along the I—I line.

In FIG. 3, a radiation image storage panel comprises a support 11, an adhesive layer 12, a light-reflecting layer 13, a stimulable phosphor layer 14, and a protective layer 15.

In FIGS. 1 and 2, a radiation image storage panel 10 is beforehand exposed to radiation (such as X-rays) having passed through an object, and hence radiation image information of the object is recorded in the storage panel 10. The storage panel 10 is so placed on the transferring belt 40 so that the phosphor layer 12 can be placed upside. The transferring belt 40 moves in the direction shown by an arrow Y, and thereby the storage panel 10 is transferred. The transferring speed of the storage panel 10 is identical with the moving speed of the belt 40, which is input into an image-reading means 30.

Figure 4:
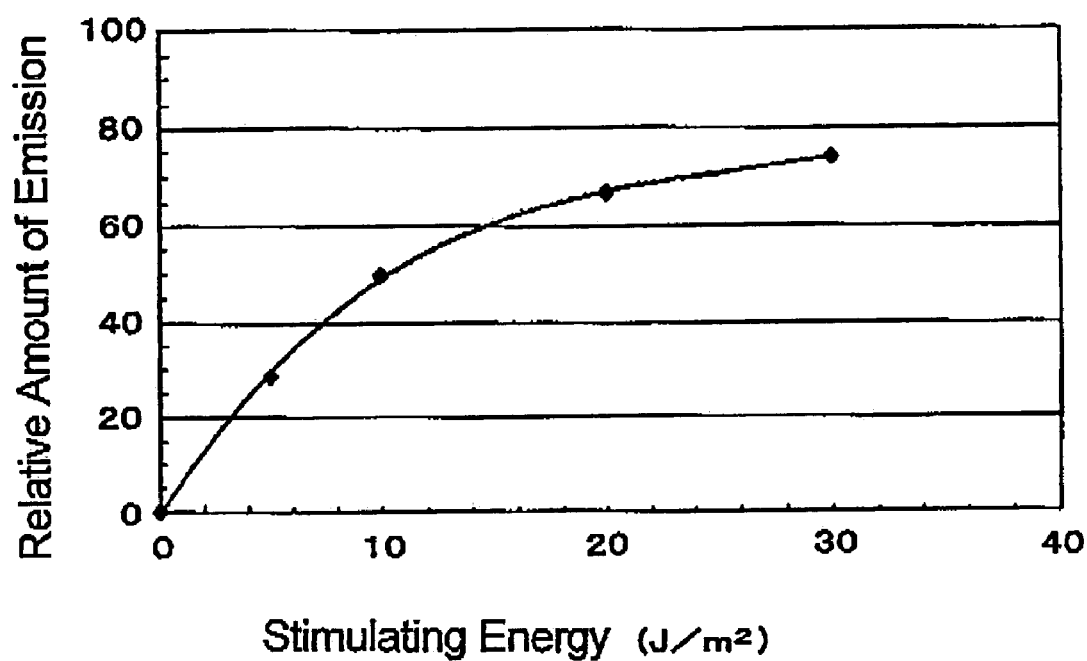
FIG. 4 graphically shows a relationship between an amount of stimulating energy applied to a radiation image storage panel and an amount of stimulated emission emitted by the storage panel.

A broad area laser (hereinafter referred to as BLD) 21 linearly emits stimulating light L almost perpendicularly to the surface of the storage panel 10. The energy of the stimulating light is so adjusted that the stimulated phosphor layer emits a stimulated emission in an amount corresponding to 10 to 90% (preferably 30 to 90%) of a saturation level. The adjustment of stimulating light can be performed by beforehand obtaining a relationship between the energy of stimulating light and the amount of stimulated emission emitted by the storage panel. See FIG. 4. Particularly, if the energy of stimulating light is so adjusted to stimulate the stimulable phosphor layer that the stimulated phosphor layer emits an increased amount of stimulated emission, the resulting reproduced radiation image becomes to have an enhanced quality.

The stimulating light L passes through an optical system 22 comprising a collimator lens and a toric lens, and is thereby converted into parallel light. The parallel light is then reflected by a dichroic mirror 24 placed at an angle of 45° to the storage panel 10. The dichroic mirror 24 reflects the stimulating light, but transmits the stimulated emission. The light reflected by the mirror 24 then advance perpendicularly to the storage panel 10, and passes through a distributed index lens array (an array of many distributed index lenses, hereinafter referred to as first SELFOC lens array) 25 and focused on the storage panel 10 linearly along the direction shown by an arrow X.

The linearly focused stimulating light L is perpendicularly applied to the storage panel 10, and thereby a stimulated emission M emits from the focused area as well as from the adjacent area. The emission M has an intensity according to the stored radiation image information.

The stimulated emission M is converted into a parallel light through the first SELFOC lens array 25, and pass through the dichroic mirror 24. The parallel light M then passes through a second SELFOC lens array 26, and are focused on photo-receiving faces of photoelectric converting elements 29 constituting a line sensor 28 placed just above the area on which the stimulating light is focused. The line sensor 28 comprises many photoelectric converting elements 29 regularly arrayed in a line having at least the length of the area linearly exposed to the stimulating light, and each element corresponds to one pixel.

The stimulated emission M having passed through the second SELFOC lens array 36 is slightly contaminated with the stimulating light L reflected by the surface of the storage panel 10, and hence the contaminating light L is cut off with a stimulating light-cutting filter 27.

The stimulated emission M received by the converting elements 29 is photoelectrically converted into signals S, which are then input into the image-reading means 30. In the image-reading means 30, the signals S are processed on the basis of the moving rate of the transferring belt 40 to obtain image data corresponding to the positions of the storage panel 10. Thus obtained image data are output on image-processing apparatus (not shown).

The radiation image information-reading apparatus used in the invention is not restricted to the embodiment shown in FIGS. 1 and 2. Each part of the apparatus (such as the light source, the light-collecting optical system between the light source and the storage panel, the line sensor, the optical system between the storage panel and the line sensor) may have various known constitution.

As the linear light source, a light source having a linear shape may be used. Further, a fluorescent lamp, a cold cathode fluorescent lamp and a LED (light-emitting diode) array can be also used. The linear light source may emit stimulating light either continuously or intermittently in the form of pulses. For reducing possible noises, the stimulating light is preferably in the form of pulses with high power.

Examples of the line sensors include an amorphous silicon sensor, a CCD sensor, a CCD with back illuminator and MOS image sensor. The line sensor may consist of two or three rows of photoelectric converting elements, as well as a single row of the elements.

The radiation image storage panel is preferably transferred almost perpendicularly to the longitudinal direction of the line light source and the line sensor. However, as long as almost all of the surface of the panel is evenly exposed to the stimulating rays, the panel may be transferred diagonally or in zigzag.

In the above-mentioned embodiments, the optical system between the storage panel and the line sensor is designed to form an image isometrically for simplifying the explanation. However, a magnifying or reducing optical system may be used. For increasing the light-collecting efficiency, the use of an isometrical or magnifying optical system is preferred.

Further, the optical path of the stimulating light L and the stimulated emission M is partly overlapped to reduce the volume of the apparatus. However, the path of the stimulating light L may be completely different from that of the emission M.

In FIGS. 1 and 2, the radiation image information is read out while the radiation image storage panel is moved. However, the information may be read out while not the storage panel but the line sensor is moved along the surface of the panel, or while both are moved to change their relative positions.

An image-processing apparatus, in which image data signals output from the radiation image information-reading means are subjected to various signal processing, may be installed. Further, an erasing means, in which radiation energy remaining in the panel after reading is adequately released, may be installed.

The radiation image storage panel and the process of the invention is advantageously used particularly in radiography for medical diagnosis, industrial radiography and fluoroscopy.

The present invention is further described by the following examples.

EXAMPLE 1

(1) Preparation of Phosphor Sheet

| | |
|---|---|
| Tetradecahedral stimulable phosphor particles: BaF ($Br_{0.85}I_{0.15}$): Eu (mean particle diameter (Dm): 5 μm) | 1,000 g |
| Binder: polyurethane elastomer (Pandex T-5265H: MEK solution of solid content 13 wt. %, Dai-nippon Ink & Chemicals, Inc.) | 182 g |
| Crosslinking agent: (polyisocyanate resin, Colonate HX (solid content: 100%), Nippon Polyurethane Co., Ltd.) | 3 g |
| Anti-yellowing agent: (epoxy resin, Epikote #1001 (solid), Yuka Shell Epoxy Co., Ltd.) | 6.7 g |

The above-mentioned materials were added to 86 g of methyl ethyl ketone, and mixed by means of a propeller mixer to prepare a phosphor dispersion having a viscosity of 3 Pa·s (binder/phosphor: 1/30, by weight). The prepared phosphor dispersion was coated by a doctor blade on a temporary support (polyethylene terephthalate sheet having a beforehand coated silicon releasing agent) of 190 μm thick, and dried to give a phosphor film (coated phosphor amount: 102 mg/$cm^2$, which was calculated by an equation of "packing density of phosphor layer"×"thickness of phosphor layer"). The phosphor film was then peeled from the temporary support to give a phosphor sheet (width: 300 mm).

(2) Preparation of Adhesive Layer

| | |
|---|---|
| Resin: saturated polyester resin (Byron 300, MEK solution of solid content 30 wt. %, Toyobo Inc.) | 20 g |
| Curing agent: polyisocyanate (Olester NP38-70S, solid content: 70%, Mitsui-Toatsu Co., Ltd.) | 2 g |
| Electroconductive agent: acicular $SnO_2$ (Sb doped) fine particles (length: 0.2–2 μm, width: 0.01–0.02 μm, FS-10P, | 50 g |

-continued

| | |
|---|---|
| MEK dispersion of solid content 30 wt. %, Ishihara Industries, Co., Ltd.) | |

The above-mentioned materials were added to 5 g of methyl ethyl ketone, and mixed to prepare a coating solution having a viscosity of 0.02–0.05 Pa·s. The coating solution was then coated on a support (polyethylene terephthalate sheet, thickness: 188 μm, haze: approx. 27, Lumilar-S-10, Toray Industries, Co., Ltd.) by means of a doctor blade, and dried to give a support having an adhesive layer (thickness: 5 μm).

(3) Preparation of Light-Reflecting Layer

| | |
|---|---|
| Light-reflecting material: high purity alumina particles, mean particle diameter: 0.4 μm, Showa Denko Co., Ltd., UA-5105) | 444 g |
| Binder: soft acrylic resin (Cryscoat P-1018GS, 20% toluene solution, Dai-nippon Ink and Chemical Industries, Co., Ltd.) | 100 g |
| Colorant: ultramarine (SM-1, Dai-ichi Chemical Co., Ltd.) | 2.2 g |

The above-mentioned materials were added to 387 g of methyl ethyl ketone, and mixed to prepare a coating solution having a viscosity of 2–3 Pa·s. The coating dispersion was then coated on the adhesive layer by means of a doctor blade, and dried to give a light-reflecting layer (thickness.: approx. 100 μm).

(4) Fixation of Phosphor Layer

The phosphor sheet was placed on the light-reflecting layer of the support in such manner that the back surface (which had been in contact with the temporary support) was brought into contact with the light-reflecting layer, and the phosphor sheet was compressed using a calendar machine under the condition of a total weight of 2,300 kg, a temperature (of a upper roll) of 45° C., a temperature (of a lower roll) of 45° C., a running rate of 0.3 m/min. By this heating compression processing, the phosphor sheet (i.e., phosphor layer) was firmly fixed to the light-reflecting layer. After the heating compression processing, the phosphor layer had a thickness of 300 μm and a packing density (of phosphor particles) of 3.40 g/cm$^3$ (65 vol. %).

(5) Preparation of Protective Layer

| | |
|---|---|
| Polymer material: fluoroolefin-vinyl ether copolymer [Lumiflon LF-504X: 30% xylene solution, Asahi Glass Co., Ltd.) | 76 g |
| Crosslinking agent: polyisocyanate (Sumijule N3500 [solid content: 100%], Sumitomo-Bayer Urethane, Inc.) | 7.5 g |
| Catalyst: dibutyl tin dilaurate (KS1260, Kyodo Yakuhin Co., Ltd.) | 0.25 mg |

The above-mentioned materials were added to 38 g of methyl ethyl ketone and mixed to prepare a coating solution. The coating solution was coated by a doctor blade on the compressed phosphor layer, and dried to give a protective layer (thickness: 3 μm).

Thus produced composite was cut to give a radiation image storage panel of the invention having a dimension of 200 mm×250 mm. The obtained radiation image storage panel of the invention had a layer structure illustrated in FIG. 3.

EXAMPLE 1-1

The procedures of Example 1 were repeated except that the stimulable phosphor layer was prepared to have a thickness of 350 μm (after the heating compression treatment), to give a radiation image storage panel of the invention. The coated phosphor amount was 122 mg/cm$^2$.

EXAMPLE 2

The procedures of Example 1 were repeated except that the protective layer was prepared from the below-mentioned materials, to give a radiation image storage panel of the invention. The coated phosphor amount was 102 mg/cm$^2$.

| | |
|---|---|
| Polymer material: fluoroolefin-vinyl ether copolymer [Lumiflon LF-504X: 30% xylene solution, Asahi Glass Co., Ltd.) | 76 g |
| Organic filer: Melamine-formaldehyde particles (mean diameter: 0.6 μm, Epostar S6, Nippon Catalyst Co., Ltd.) | 11 g |
| Crosslinking agent: polyisocyanate (Sumijule N3500 [solid content: 100%], Sumitomo Bayer Urethane, Inc.) | 7.5 g |
| Coupling agent: acetoalkoxyaluminum diisopropionate (Plane-act Al-M, Ajinomoto Co., Inc.) | 0.1 g |
| Catalyst: dibutyl tin dilaurate (KS1260, Kyodo Yakuhin Co., Ltd.) | 0.25 mg |

EXAMPLE 2-1

The procedures of Example 2 were repeated except that the stimulable phosphor layer was prepared to have a thickness of 350 μm (after the heating compression treatment), to give a radiation image storage panel of the invention. The coated phosphor amount was 122 mg/cm$^2$.

EXAMPLE 3

The procedures of Example 1 were repeated except that the stimulable phosphor layer was prepared from the below-mentioned materials and 83 g of methyl ethyl ketone and that the protective layer was prepared from the materials of Example 2, to give a radiation image storage panel of the invention. The coated phosphor amount was 101 mg/cm$^2$.

| | |
|---|---|
| Tetradecahedral stimulable phosphor particles: BaF (Br$_{0.85}$I$_{0.15}$): Eu (mean particle diameter (Dm): 5 μm) | 1,000 g |
| Binder: polyurethane elastomer (Pandex T-5265H: MEK solution of solid content 13 wt. %, Dai-nippon Ink & Chemicals, Inc.) | 273 g |
| Crosslinking agent: (polyisocyanate resin, Colonate HX (solid content: 100%), Nippon Polyurethane Co., Ltd.) | 4.5 g |
| Anti-yellowing agent: (epoxy resin, Epikote #1001 (solid), Yuka Shell Epoxy Co., Ltd.) | 10 g |

EXAMPLE 3-1

The procedures of Example 3 were repeated except that the stimulable phosphor layer was prepared to have a thickness of 350 μm (after the heating compression treatment), to give a radiation image storage panel of the invention. The coated phosphor amount was 121 mg/cm$^2$.

EXAMPLE 4

The procedures of Example 1 were repeated except that tetradecahedral stimulable phosphor particles having a mean particle diameter (Dm) of 3.5 μm were employed for the preparation of a phosphor sheet and that the protective layer was prepared from the materials of Example 2, to give a radiation image storage panel of the invention.

The coated phosphor amount was 100 mg/cm$^2$.

After the heating compression processing, the phosphor layer had a thickness of 300 μm and a packing density (of phosphor particles) of 3.32 g/cm$^3$ (64 vol. %).

EXAMPLE 5

The procedures of Example 1 were repeated except that tetradecahedral stimulable phosphor particles having a mean particle diameter (Dm) of 3.5 μm were employed for the preparation of a phosphor sheet and that 16 g of an organic filer (Melamine-formaldehyde particles, Epostar S12, mean diameter: 1.1 μm, Nippon Catalyst Co., Ltd.) was employed for the preparation of a protective layer, to give a radiation image storage panel of the invention.

The coated phosphor amount was 102 mg/cm$^2$.

EXAMPLE 6

The procedures of Example 1 were repeated except that a phosphor layer was formed on the light-reflecting layer in the below-described manner, to give a radiation image storage panel of the invention.

A couple of phosphor sheets each having a thickness of 200 μm were prepared. One phosphor sheet was placed on the light-reflecting layer of the support in such manner that the upper surface (which had been not in contact with the temporary support) was brought into contact with the light-reflecting layer, and the phosphor sheet was compressed using a calendar machine under the condition of a total weight of 1,600 kg, a temperature (of a upper roll) of 45° C., a temperature (of a lower roll) of 45° C., a running rate of 0.3 m/min, to form a lower phosphor layer. Subsequently, another phosphor sheet was placed on the lower phosphor layer in such manner that the upper surface (which had been in contact with the temporary support) was brought into contact with the lower phosphor layer, and the phosphor sheet was compressed using a calendar machine under the condition of a total weight of 2,300 kg, a temperature (of a upper roll) of 45° C., a temperature (of a lower roll) of 45° C., a running rate of 0.3 m/min, to form an upper phosphor layer. The upper phosphor layer, the lower phosphor layer, and the light-reflecting layer were firmly fixed to each other. After the heating compression processings, the combined phosphor layer had a total thickness of 300 μm and a packing density (of phosphor particles) of 3.39 g/cm$^3$ (65 vol. %).

The coated phosphor amount was 102 mg/cm$^2$.

On the combined stimulable phosphor layers was placed a protective layer of Example 2.

EXAMPLE 7

The procedures of Example 1 were repeated except that a phosphor layer was formed on the light-reflecting layer in the below-described manner, to give a radiation image storage panel of the invention.

One phosphor sheet having a thickness of 200 μm was prepared using materials of Example 1. This phosphor sheet was placed on the light-reflecting layer of the support in the same manner as described in Example 6, to form a lower phosphor layer. Another phosphor sheet having a thickness of 200 μm was prepared using materials of Example 4. This phosphor sheet was placed on the lower phosphor layer in the same manner as described in Example 6. After the heating compression processings, the combined phosphor layer had a total thickness of 300 μm and a packing density (of phosphor particles) of 3.38 g/cm$^3$ (65 vol. %).

The coated phosphor amount was 101 mg/cm$^2$. On the combined stimulable phosphor layers was placed a protective layer of Example 2.

Comparison Example 1

The procedures of Example 1 were repeated except that a phosphor layer was formed on the light-reflecting layer in the below-described manner and that a protective layer was formed in the below-described manner, to give a radiation image storage panel for comparison.

The coated phosphor amount was 98 mg/cm$^2$.

(1) Preparation of for Phosphor Sheet

| | |
|---|---|
| Tetradecahedral stimulable phosphor particles: BaF (Br$_{0.85}$I$_{0.15}$): Eu (mean particle diameter (Dm): 5 μm) | 1,000 g |
| Binder: polyurethane elastomer (Desmolak 4125: solid content 100%, Sumitomo-Bayer Urethane Inc.) | 112.5 g |
| Anti-yellowing agent: (epoxy resin, Epikote #1001 (solid), Yuka Shell Epoxy Co., Ltd.) | 7 g |

The above-mentioned materials were added to 370 g of methyl ethyl ketone to prepare a phosphor dispersion of a viscosity of 3 Pa·s (binder/phosphor: 1/8.4, weight ratio), and a phosphor sheet was prepared in the same manner as in Example 1.

(2) Preparation of a Protective Layer

A poly(ethylene terephthalate) film (thickness: 10 μm) was fixed to the phosphor layer using a polyester adhesive layer (thickness: 1.5 μm).

After the heating compression processings, the phosphor layer had a total thickness of 300 μm and a packing density (of phosphor particles) of 3.27 g/cm$^3$ (63 vol. %).

Comparison Example 1-1

The procedures of Comparison Example 1 were repeated except that the stimulable phosphor layer was prepared to have a thickness of 350 μm (after the heating compression treatment), to give a radiation image storage panel of the invention. The coated phosphor amount was 117 mg/cm$^2$.

Evaluation of Radiation Image Storage Panel

Each radiation image storage panel prepared above was evaluated with respect to light-scattering length, haze, and quality of the reproduced radiation image, in the following manners.

(1) Measurement of Light-Scattering Length for Phosphor Layer and Light-Reflecting Layer The light-scattering length was obtained by the procedures described hereinbefore. The lights to be scattered were a main peak wavelength (representative wavelength: 660 nm) of the stimulation spectrum of the stimulable phosphor contained in the phosphor layer and a maxim=peak wavelength (representative wavelength: 400 nm) of a stimulated emission spectrum.

(2) Measurement of Haze of Protective Layer

The same protective layer as that incorporated in the radiation image storage panel was prepared on a transparent poly(ethylene terephthalate) sheet (thickness: 25 μm), to obtain a specimen of a protective layer. The haze of the specimen of a protective layer was measured by means of a haze meter (NDH-300A, Nihon Denshoku Co., Ltd.). A haze of the same transparent poly(ethylene terephthalate) sheet was separately measured, to calculate the haze of the protective layer.

(3) Evaluation of Radiation Image Quality

The radiation image storage panel was exposed to X-rays (tungsten bulb, bulb voltage: 80 kVp, corresponding to 10 mR) through an MTF chart. Subsequently, the stimulable phosphor layer was stimulated with a semiconductor laser (wavelength: 660 nm) at a stimulating energy of 15 J/m$^2$. The stimulated emission produced from the storage panel was detected by a photomultiplier tube (sensitivity: S-5) to convert into electric signals. From the obtained signals, a radiographic image was reproduced on a display of an image-reproducing apparatus. Thus, the sharpness (MTF: %) of the reproduced radiographic image was determined.

Independently, the whole surface of the radiation image storage panel was exposed to X-rays (corresponding to 1 mR) to obtain a Wiener spectrum of graininess.

From the above-obtained data, a DQE (Detective Quantum Efficiency) at a spatial frequency of 1 cycle/mm was obtained. It was known that the graininess depends on the amount of X-rays. Therefore, the graininess was corrected by monitoring the exposed X-rays to correspond to a value at an X-ray amount of 1 mR.

The results are set forth in Table 1.

TABLE 1

| | Light-scattering length | | | | |
|---|---|---|---|---|---|
| | LR layer 400 nm/ 660 nm | Phosphor layer 400 nm/ 600 nm | Haze | DQE | MTF |
| Ex. 1 | 3.3 μm/ 3.7 μm | 13 μm/ 15 μm | 6 | 24.5% | 62.0% |
| Ex. 1-1 | 3.3 μm/ 3.7 μm | 13 μm/ 15 μm | 6 | 26.0% | 59.0% |
| Ex. 2 | 3.3 μm/ 3.7 μm | 13 μm/ 15 μm | 42 | 25.5% | 62.5% |
| Ex. 2-1 | 3.3 μm/ 3.7 μm | 13 μm/ 15 μm | 42 | 27.0% | 59.5% |
| Ex. 3 | 3.3 μm/ 3.7 μm | 15 μm/ 17 μm | 42 | 24.0% | 59.0% |
| Ex. 3-1 | 3.3 μm/ 3.7 μm | 15 μm/ 17 μm | 42 | 24.5% | 55.5% |
| Ex. 4 | 3.3 μm/ 3.7 μm | 6 μm/ 7.5 μm | 42 | 25.0% | 67.0% |
| Ex. 5 | 3.3 μm/ 3.7 μm | 6 μm/ 7.5 μm | 58 | 25.5% | 66.5% |
| Ex. 6 | 3.3 μm/ 3.7 μm | 13 μm/ 15 μm | 42 | 25.5% | 64.0% |
| Ex. 7 | 3.3 μm/ 3.7 μm | 10 μm/ 12 μm | 42 | 26.0% | 65.5% |
| Com.1 | 3.3 μm/ 3.7 μm | 21 μm/ 23 μm | 4 | 22.5% | 53.5% |
| Com.1-1 | 3.3 μm/ 3.7 μm | 21 μm/ 23 μm | 4 | 22.0% | 50.5% |

Remarks:
LR layer: Light-reflecting layer
Haze: Haze of protective layer
DQE: 1 mR, 1 cycle/mm, stimulated with 15 J/m$^2$
MTF: 1 mR, 1 cycle/mm, stimulated with 15 J/m$^2$
Light-scattering length: mean value From the results set forth in Table 1, it is clear that the radiation image storage panel of the invention (Examples 1 to 7) which shows a short light-scattering length for the light-reflecting layer and a light-scattering length of a specific range (5 to 20 μm) gives a higher DQE and better image quality (in regard of sharpness and graininess), as compared with the radiation image storage panel for comparison (Comparison Examples 1 and 1-1). In addition, in the radiation image storage panels of Comparison Examples, DQE lowers in the case that the stimulable phosphor layer has an increased thickness (this means increase of the coated phosphor amount), while in the radiation image storage panels of the present invention showing a relative short light-scattering length, DQE takes a higher value when the stimulable phosphor layer has an increased thickness.

(4) Measurement of Saturation Level of Stimulated Emission

The radiation image storage panel of Example 1 was exposed to X-rays (tungsten bulb, bulb voltage: 80 kVp, corresponding to 10 mR). Subsequently, the stimulable phosphor layer was stimulated with a semiconductor laser (wavelength: 660 nm) at a varying stimulating energy in the range of 5 to 30 J/m$^2$. The amount of stimulated emission produced from the storage panel was detected by a photomultiplier tube. The relationship between an amount of stimulating energy and an amount of stimulated emission was plotted in a graph of FIG. 4. The plotted curve was extended for extrapolation to obtain a saturation value. The amount of stimulated emission is set forth in Table 2 in terms of a relative value based on the saturation value (set to 100).

TABLE 2

| Stimulating energy (J/m$^2$) | Relative amount of stimulated emission |
|---|---|
| 0 | 0 |
| 5 | 28.8 |
| 10 | 50 |
| 20 | 67.5 |
| 30 | 75 |

What is claimed is:

1. A radiation image storage panel having a stimulable phosphor layer, a light-reflecting layer provided thereon, and a protective layer provided on the stimulable phosphor layer on the side opposite to the light-reflecting layer, wherein said stimulable phosphor layer comprises a binder and stimulable phosphor particles in the form of tetradecahedrons or globules having a diameter in the range of 2 to 10 μm in a weight ratio of 1:10 to 1:50, said light-reflecting layer comprises a binder and a light-reflecting material in the form of particles, said light-reflecting materials being selected from the group consisting of $Al_2O_3$, $ZrO_2$, MgO, $BaSO_4$, $SiO_2$, ZnS, ZnO, $CaCO_3$, $Sb_2O_3$, $Nb_2O_5$, $2PbCO_3Pb(OH)_2$, $PbF_2$, $BiF_3$, $Y_2O_3$, YOCl, $M^{II}FX$ ($M^{II}$ is Ba, Sr, or Ca, and X is Cl or Br), lithopone ($BaSO_4$+ZnS), magnesium silicate, basic lead silicate sulfate, basic lead phosphate, aluminum silicate, and hollow polymer powder, and the protective layer comprises a polymer material and a filler dispersed in the polymer material and has a haze in the range of 30 to 60%, said filler having a mean particle size of 0.1 to 10 μm.

2. The radiation image storage panel of claim 1, wherein said stimulable phosphor particles are contained in the phosphor layer at a packing density of 60 vol. % or more.

3. The radiation image storage panel of claim 1, wherein a support sheet is attached to the light-reflecting layer via a cured adhesive layer.

4. The radiation image storage panel of claim 3, wherein the cured adhesive layer is cured in the presence of a curing agent.

5. The radiation image storage panel of claim 4, wherein the curing agent is an isocyanate compound.

6. The radiation image storage panel of claim 3, wherein the cured adhesive layer has a thickness of 1 to 50 μm.

7. A process for reading a radiation image information out of a radiation image storage panel of claim 1, which comprises the steps of:

placing means for emitting stimulating light and photoelectrically detecting stimulated emission in the vicinity of the radiation image storage panel on a surface side opposite to the light-reflecting layer;

applying a stimulating light to the stimulable phosphor layer of the radiation image storage panel with such stimulating energy that the stimulable phosphor layer emits a stimulated emission in an amount corresponding to 10 to 90% of a saturation level, while moving said means relatively to a position of the radiation image storage panel along a surface of the radiation image storage panel and scanning the stimulating light in a direction differing from a direction of the movement of the means;

detecting the stimulated emission in sequence by the means; and converting the detected stimulated emission into electric signals corresponding to a radiation image information.

8. The process of claim 7, wherein the stimulating light is applied to the stimulable phosphor layer of the radiation image storage panel with such stimulating energy that the stimulable phosphor layer emits a stimulated emission in an amount corresponding to 30 to 90% of a saturation level.

9. The process of claim 7, wherein the means for emitting stimulating light and photoelectrically detecting stimulated emission comprises a line sensor composed of plural photoelectric conversion elements aligned in line.

* * * * *